(12) United States Patent
Maeder

(10) Patent No.: US 7,624,534 B1
(45) Date of Patent: Dec. 1, 2009

(54) SPIRAL PLANT SUPPORT

(76) Inventor: Pierre Maeder, 3118 Tunnel Hill Rd., Lebanon, PA (US) 17046

( * ) Notice: Subject to any disclaimer, the term of this patent is extended or adjusted under 35 U.S.C. 154(b) by 0 days.

(21) Appl. No.: 11/901,890

(22) Filed: Sep. 20, 2007

Related U.S. Application Data

(60) Provisional application No. 60/903,398, filed on Feb. 26, 2007.

(51) Int. Cl.
*A01G 17/06* (2006.01)
*F16M 11/00* (2006.01)
(52) U.S. Cl. ............... 47/47; 47/70; 248/408; 248/157
(58) Field of Classification Search ............ 47/44, 47/45, 47, 42, 70, 39; 248/157, 423, 529, 248/407, 408, 150, 151, 159, 165; *A01G 17/04, A01G 17/06*
See application file for complete search history.

(56) References Cited

U.S. PATENT DOCUMENTS

| | | | |
|---|---|---|---|
| 85,244 A * | 12/1868 | Rowley | 47/58.1 R |
| 122,952 A * | 1/1872 | McDonald | 52/154 |
| 417,838 A | 12/1889 | Richards | 47/47 |
| 918,579 A * | 4/1909 | Murch | 248/353 |
| 2,000,911 A | 5/1935 | Balousek | 47/47 |
| 2,577,373 A | 12/1951 | Smith | 47/47 |
| 2,763,096 A * | 9/1956 | Roger | 47/45 |
| 4,860,489 A | 8/1989 | Bork | 47/47 |
| 5,067,274 A | 11/1991 | Lewis | 47/47 |
| 5,174,060 A | 12/1992 | Glamos | 47/45 |
| 5,640,802 A | 6/1997 | Elliot | 47/45 |
| 6,006,477 A * | 12/1999 | Ko | 135/25.4 |
| 6,702,239 B2 * | 3/2004 | Boucher | 248/156 |
| 6,922,943 B1 * | 8/2005 | Paille et al. | 47/47 |
| 7,194,829 B2 * | 3/2007 | Boire et al. | 40/316 |
| 7,219,467 B1 * | 5/2007 | Branman | 47/45 |
| 2004/0068925 A1 * | 4/2004 | Puspurs | 47/45 |

* cited by examiner

*Primary Examiner*—Rob Swiatek
*Assistant Examiner*—Kristen C Hayes
(74) *Attorney, Agent, or Firm*—Charles M. Kaplan

(57) ABSTRACT

A flexible strand is wound around a pole of adjustable height into a plant supporting helix forming a plurality of loops connected to the pole by quick-release fasteners.

14 Claims, 13 Drawing Sheets

SPIRAL PLANT SUPPORT

This application is entitled to the date and benefit of U.S. Provisional Patent application Ser. No. 60/903,398, which was filed on Feb. 26, 2007.

BACKGROUND OF THE INVENTION

This invention relates to gardening and farming and more particularly to accessories such as plant supports.

Providing support for plants has several benefits. A plant, such as a tomato or pepper, which has a fragile stem that is prone to breakage when exposed to strong winds, and bending when it produces heavy fruit, will benefit from an external support structure, which will reduce breakage and damage to the stem, and will also keep ripe fruit from weighing down limbs until the fruit touches the ground where it may rot.

A common method of supporting fruit bearing plants included using a single stake to which the plant was tied, and retied as it grew taller; tying was time consuming and restricted movement of the plant, which often caused breakage or bruising at the tie point.

Prior art solutions using spiral or curving wires to eliminate the need for tying a plant to a stake have had deficiencies avoided by this invention. Some had no vertical support or only supported the wire at the top or bottom of a stake. Others could not be adjusted before or after a plant began to grow. Some required multiple stakes for support, while others were not easily disassembled for shipping, marketing, or storage after the plant growing season ends. Those using a spiral support made the spiral from solid material, which had a poor strength to weight ratio, and was not compressible.

OBJECTIVES OF THE INVENTION

Accordingly, it is an object of this invention to provide improved spiral plant supporting structures.

Another object is to provide an adjustable plant support.

An additional object is to provide a corrosion free plant support.

Another object is to provide a spiral plant support that is simple, lightweight, inexpensive to manufacture, package, transport and market.

A further object is to provide a plant support that is easy to assemble, install, disassemble when not in use, and compact when stored.

A further object is to provide plastic spiral plant supports that are rugged, economical, highly attractive, easy to use, and which do not possess defects found in similar prior art gardening aids.

Other objects and advantages of the gardening accessories incorporating this invention will be found in the specification and claims and the scope of the invention will be set forth in the claims.

DESCRIPTION OF THE INVENTION

Figure 1:
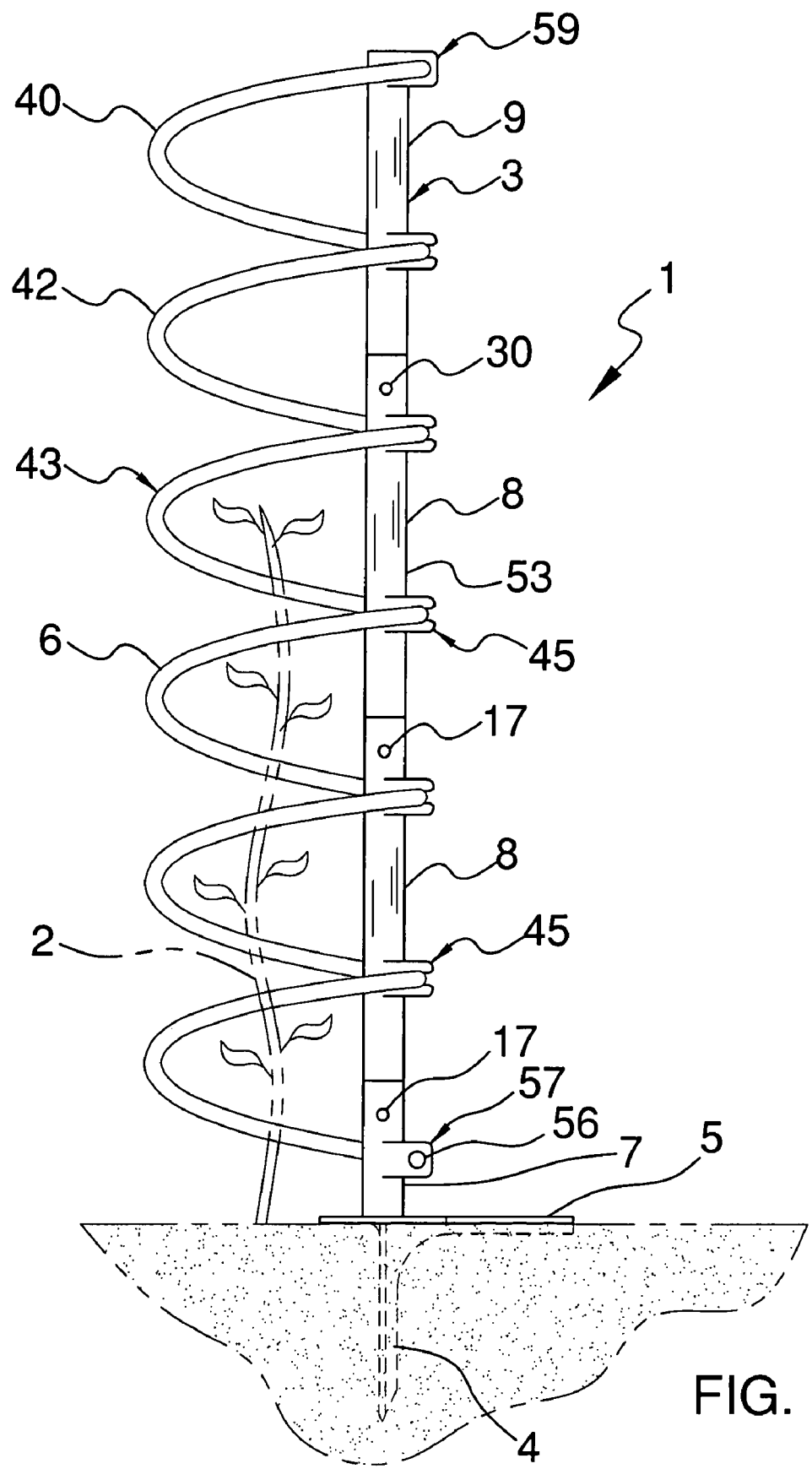
FIG. 1 is a side view of an embodiment of a spiral plant support in accord with this invention.
Figure 2:
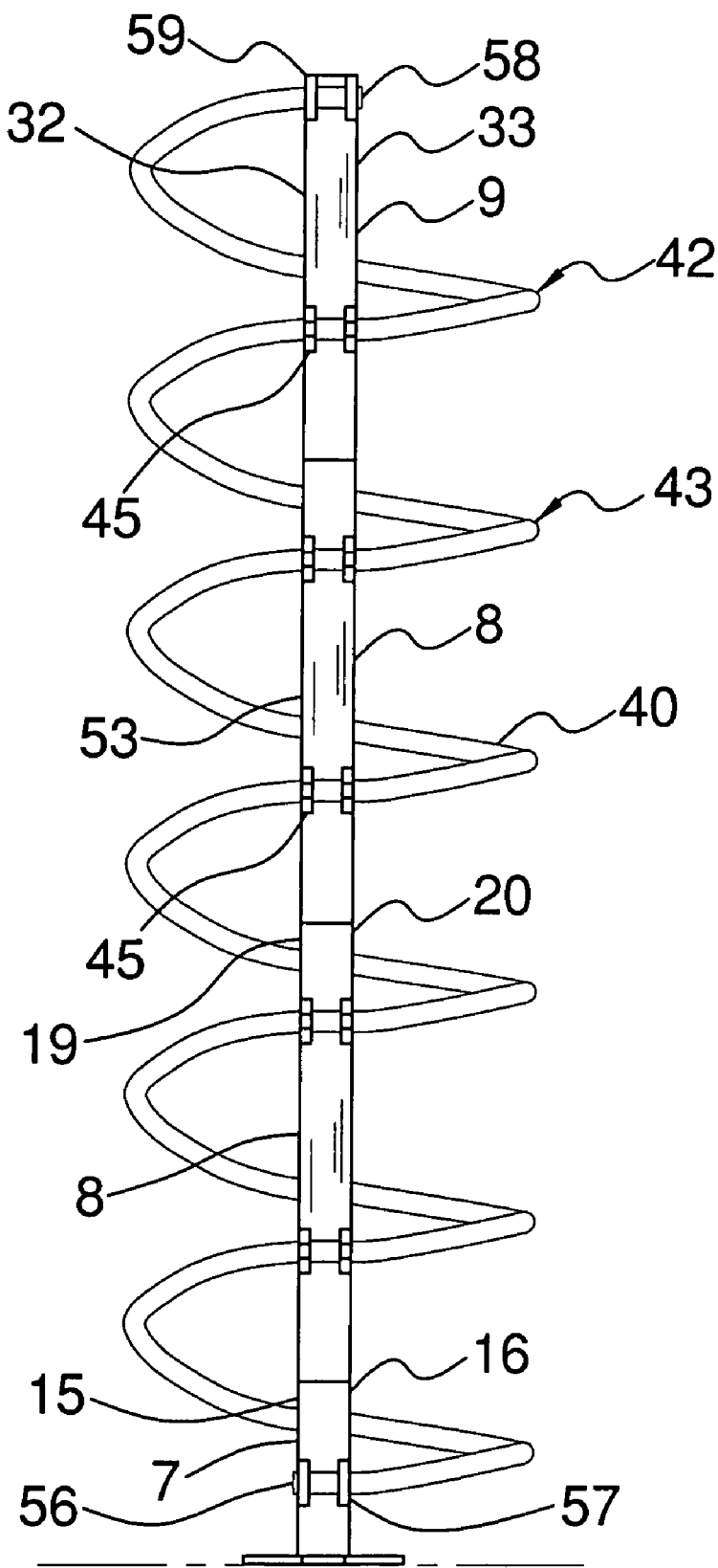
FIG. 2 is rear view of the plant the support shown in FIG. 1.

FIG. 1 shows how the spiral plant support 1 is used to support a plant 2. The support pole 3 is held in the ground by a vertical spike 4 and horizontal crosspiece 5 inserted into the ground closely adjacent to the plant 2, which will drape its stems, leaves and fruit over the strand 6 as it grows.

The support pole 3 comprises a plurality of separable, circular, hollow, tubular pole sections made from a resilient, durable plastic resin, such as polyporplyne. A bottom pole section 7 is coupled to one or more intermediate pole sections 8, which are coupled to a top pole section 9. The length of pole 3 is determined by the number of intermediate sections 8 that have been joined to each other and to the top section 9 and bottom section 7 by interlocking means 10 on each of the pole sections. The pole sections may have an outside diameter of 1 and 5/8 inches.

The interlocking means of the bottom pole section 7 may be a first circular hole 11 through the tubular wall of section 7 and a first slot 12 that extends downwardly from the upper terminal edge 13 of the section. The hole 11 is located adjacent, but is spaced downwardly from, the edge 13. The hole 11 and the slot 12 are located on diametrically opposite surfaces 15 and 16 of section 7, and the top of hole 11 is located below the bottom of slot 12.

The interlocking means of an intermediate section 8 includes a first button 17 sized to fit into the first hole 11, and a second button 18 sized to fit into the first slot 12 and prevent the pole sections from twisting. The buttons 17 and 18 protrude from diametrically opposite surfaces 19 and 20 of thin-walled, bottom end portion 21 of section 8. The outer diameter of end portion 21 is less than the internal diameter of section 7 so that end portion 21 can telescope into the upper end of section 7. The outer end 22 of button 17 is essentially aligned with the outer surfaces of sections 7 and 8 when the sections are interlocked.

The lower edge 23 of button 17 is slanted inwardly toward surface 19 so as to ease entry of the button into section 7 and hole 11. A continuous slit 24 having parallel edges cuts through end portion 21 and passes below button 17 so as to define a flexible tab 28 with button 17 at its bottom end. Flexing of tab 28 inwardly enables button 17 to be inserted into and removed from hole 11. The section 8 may be disconnected from interlocking engagement with bottom section 7 by pressing button 17 out of hole 11 and pulling the two pole sections apart. The thickness of end portion 21 (e.g. 2 mm), its outside diameter (e.g. 36 mm), and the resilience of the plastic from which the tubular sections are made enable the described flexing of the tabs and tube walls without damage thereto.

The interlocking means of the intermediate pole sections 8 also may include a second circular hole 25 through the tubular wall of a section 8 and a second slot 26 that extends downwardly from the upper terminal edge 27 of the intermediate section. The hole 25 is located adjacent, but is spaced downwardly from, the edge 27. The hole 25 and the slot 26 are located on the diametrically opposite surfaces 19 and 20 of section 8, and the top of hole 25 is located below the bottom of slot 26. The second hole 25 and second slot 26 are sized, located and arranged so that they correspond identically to the first hole 11 and the first slot 12 in bottom section 7. This enables the intermediate sections 8 to be interlocked with each other by insertion and retraction of the first and second buttons 17 and 18 as described above regarding the interlocking of pole sections 7 and 8.

The interlocking means of a top pole section 9 includes a third button 30 sized to fit into the second hole 25, and a fourth button 31 sized to fit into the second slot 26. The buttons 30 and 31 protrude from diametrically opposite surfaces 32 and 33 of thin-walled, bottom end portion 34 of section 9. The outer diameter of end portion 34 is less than the internal diameter of section 8 so that end portion 34 can telescope into the upper end of section 8. The third button 30 and fourth button 31 are sized, located and arranged so that they correspond identically to the first button 17 and the second button 18 in intermediate section 8. This enables the upper section 9 to be interlocked with the intermediate and bottom sections by insertion and retraction of the third and fourth buttons 30 and 31 as described above regarding the interlocking of pole sections 7 and 8.

The lower edge 35 of button 30 is slanted inwardly toward surface 32 so as to ease entry of the button into section 8 and hole 25. The outer end 36 of button 30 is essentially aligned with the outer surfaces of sections 8 and 9 when the sections are interlocked. The section 9 may be disconnected from interlocking engagement with intermediate section 8 by pressing button 30 out of hole 25, while inwardly flexing a tab 37 defined by a slit 38, as described above with reference to tab 28, and pulling the two pole sections apart. The thickness and resilience of end portion 34 is the same as end portion 21 of section 8.

Figure 9:
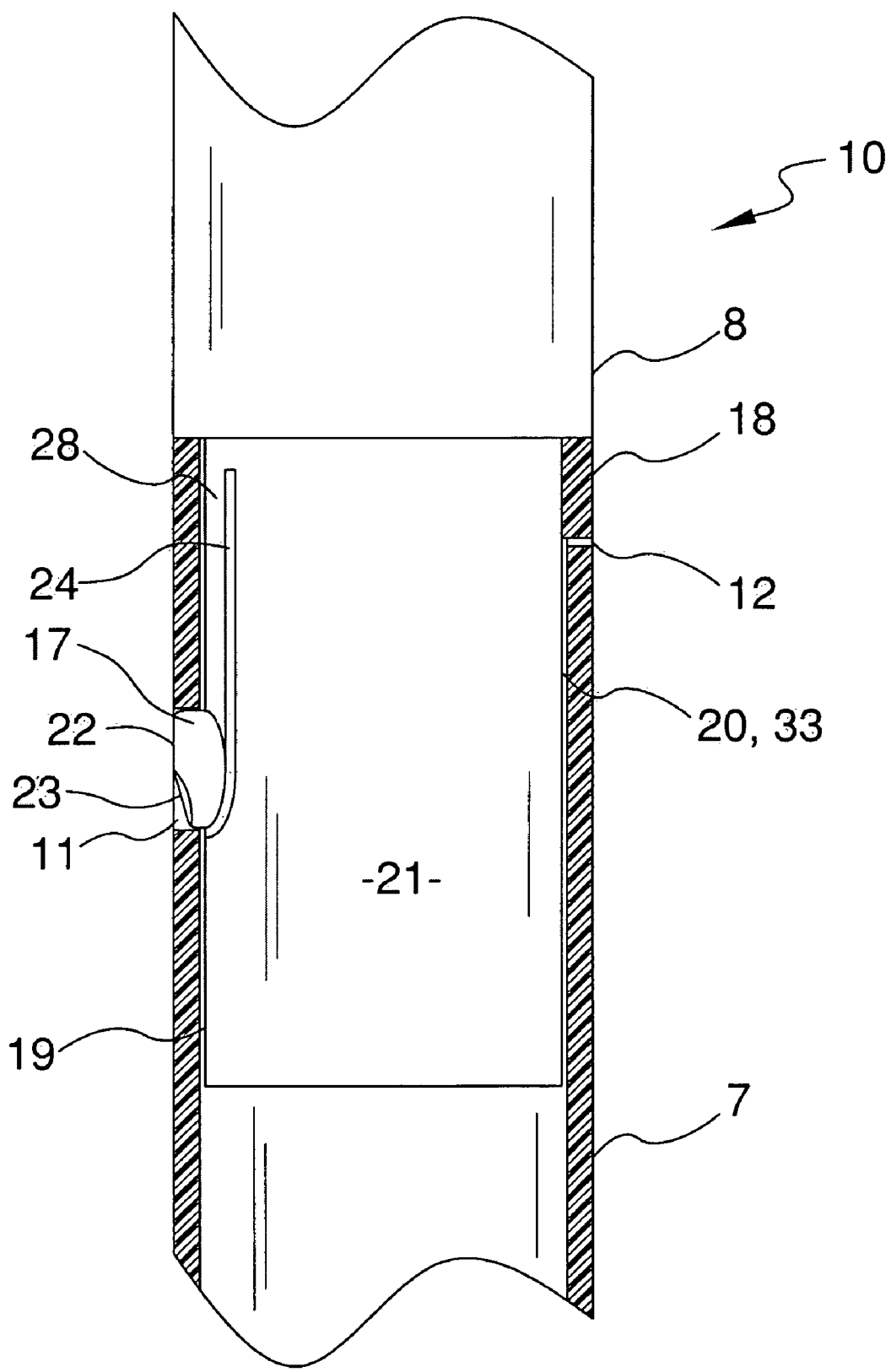
FIGS. 9 and 9A are enlarged, partially cross sectional, side views of interlocked pole sections.
Figure 9A:
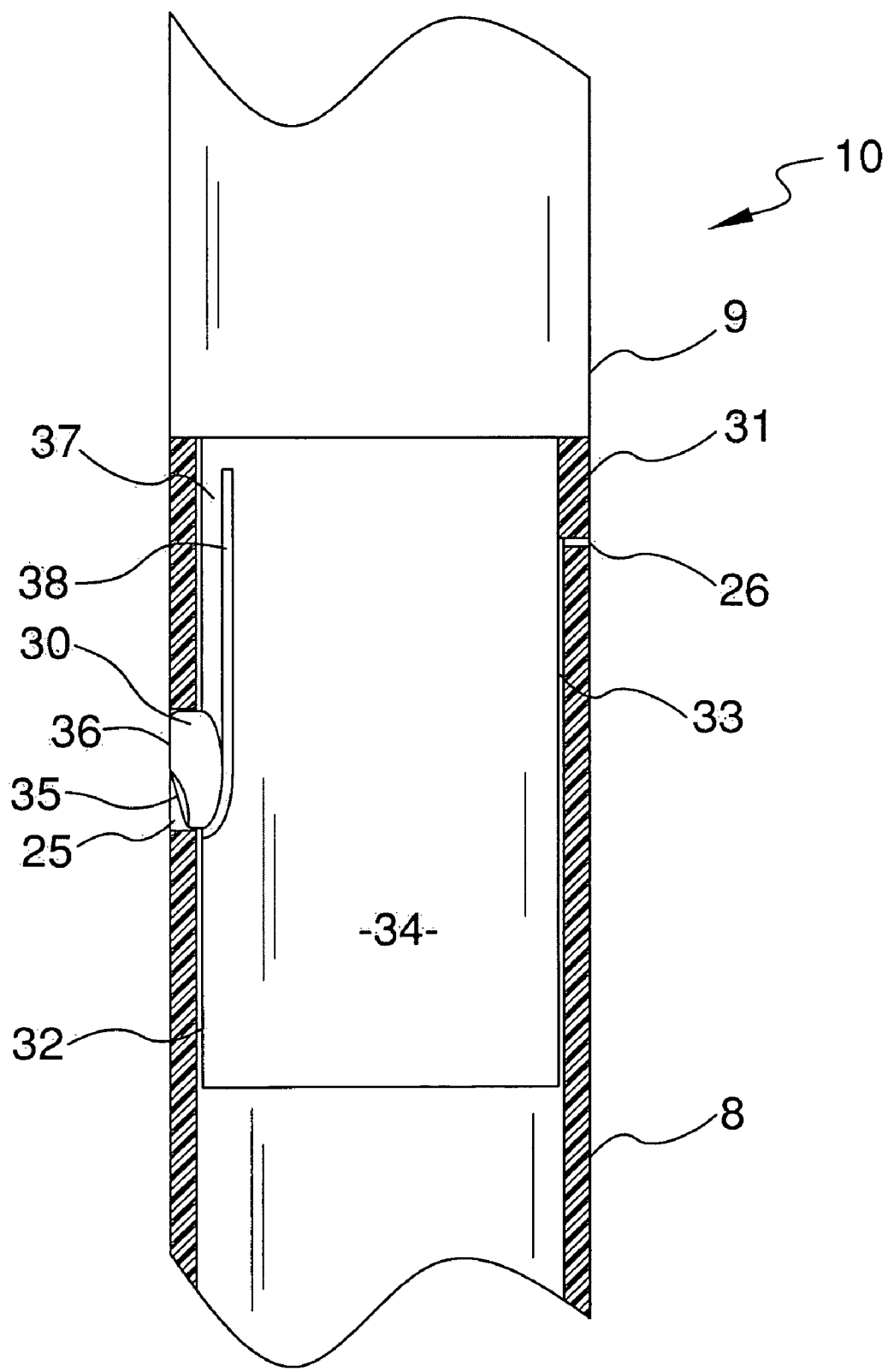
Figure 10:
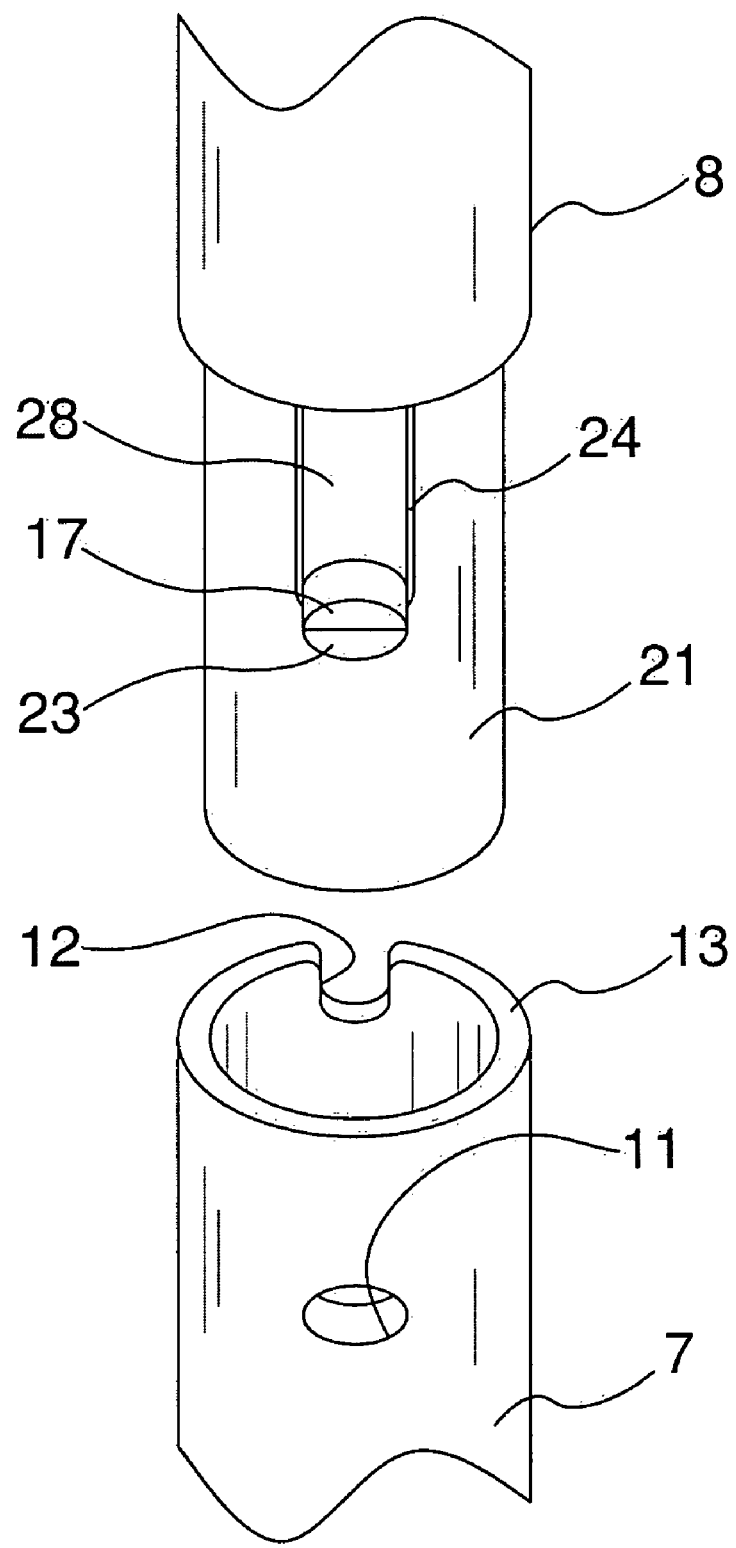
FIGS. 10 and 10A are enlarged partial side views of separated pole sections.
Figure 10A:
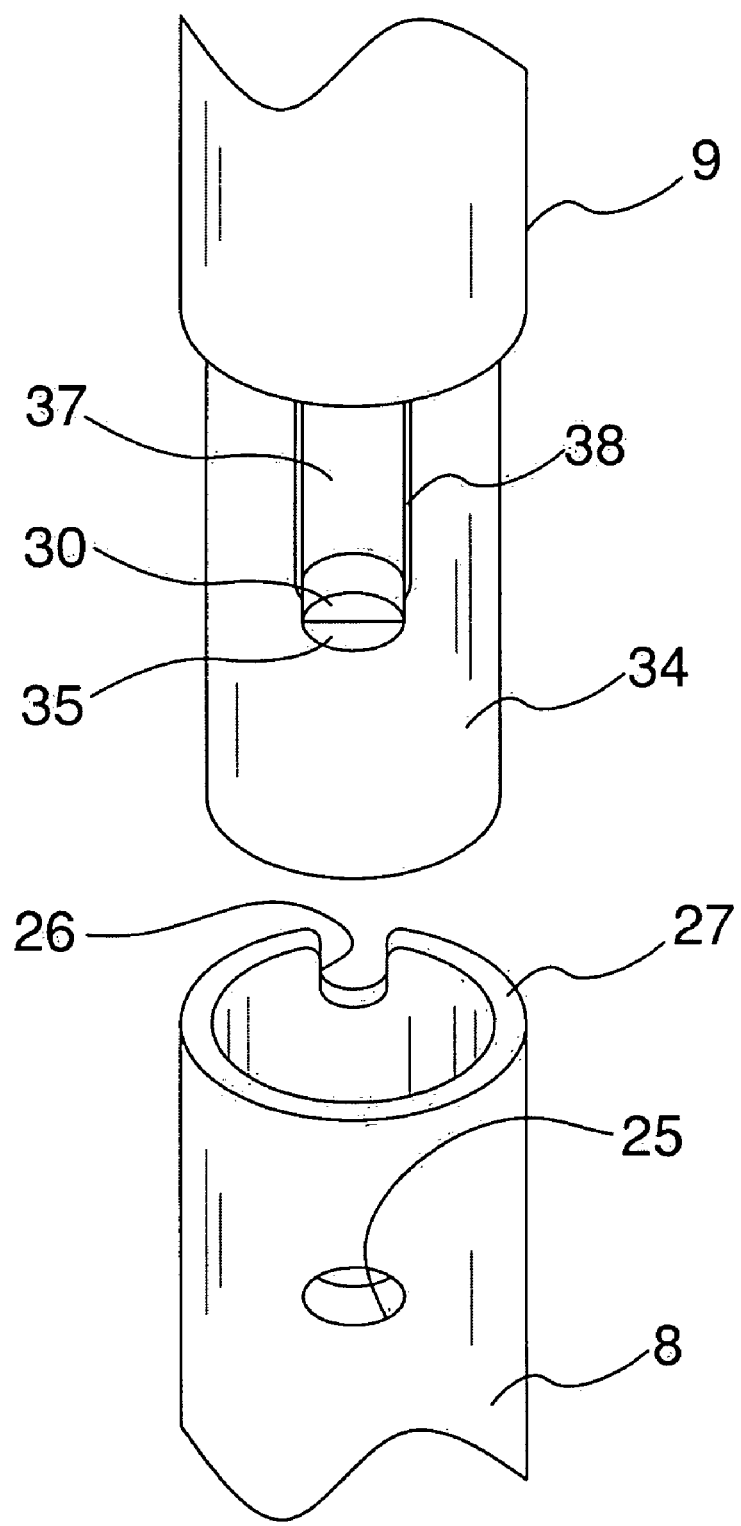
Figure 11:
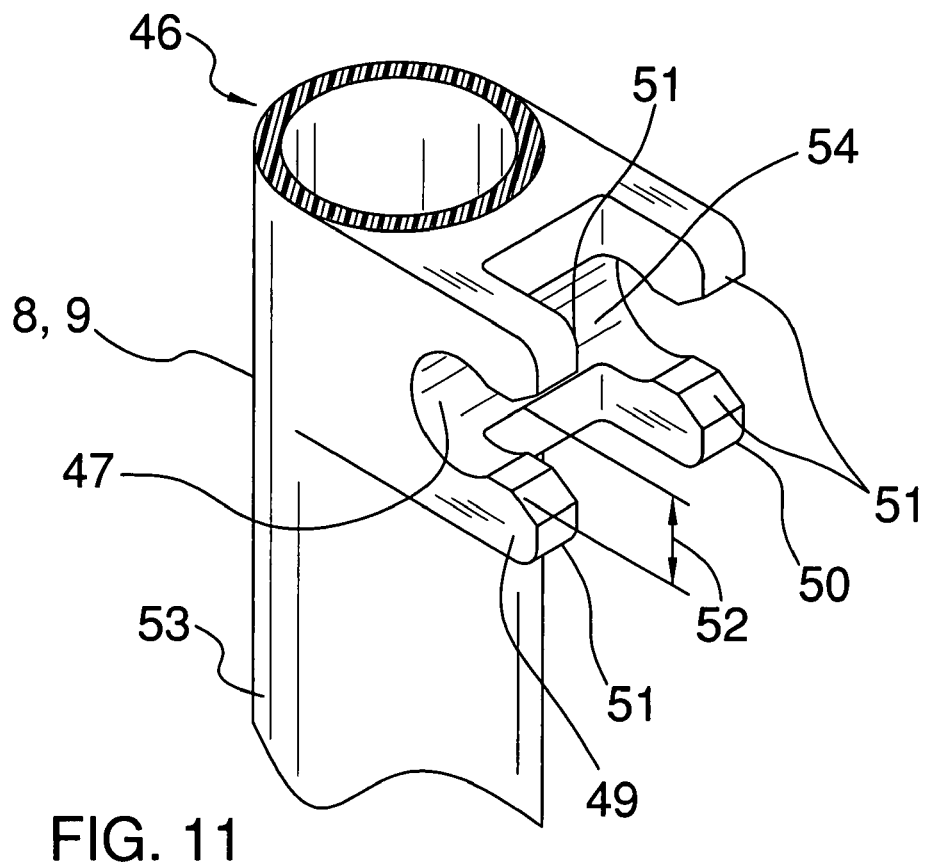
FIG. 11 is an enlarged perspective view of a connector clamp.
Figure 12:
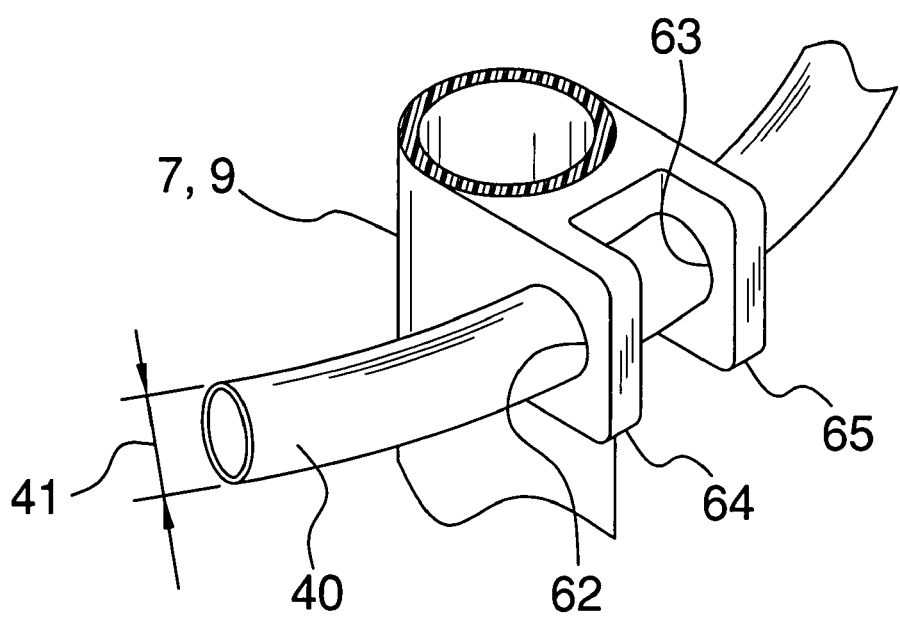
FIG. 12 is an enlarged perspective view of a strand in a receiver.

The manner in which the interlocking means 10 joins the poles sections 7 and 8 and the pole sections 8 and 9 is shown in FIGS. 9 and 9A, where corresponding parts are identified with the several reference numbers from their respective pole section. The pole sections may be disconnected by pressing the button 22 or 36 clear of the hole 11 or 25 and pulling the engaged pole sections apart.

Figure 3:
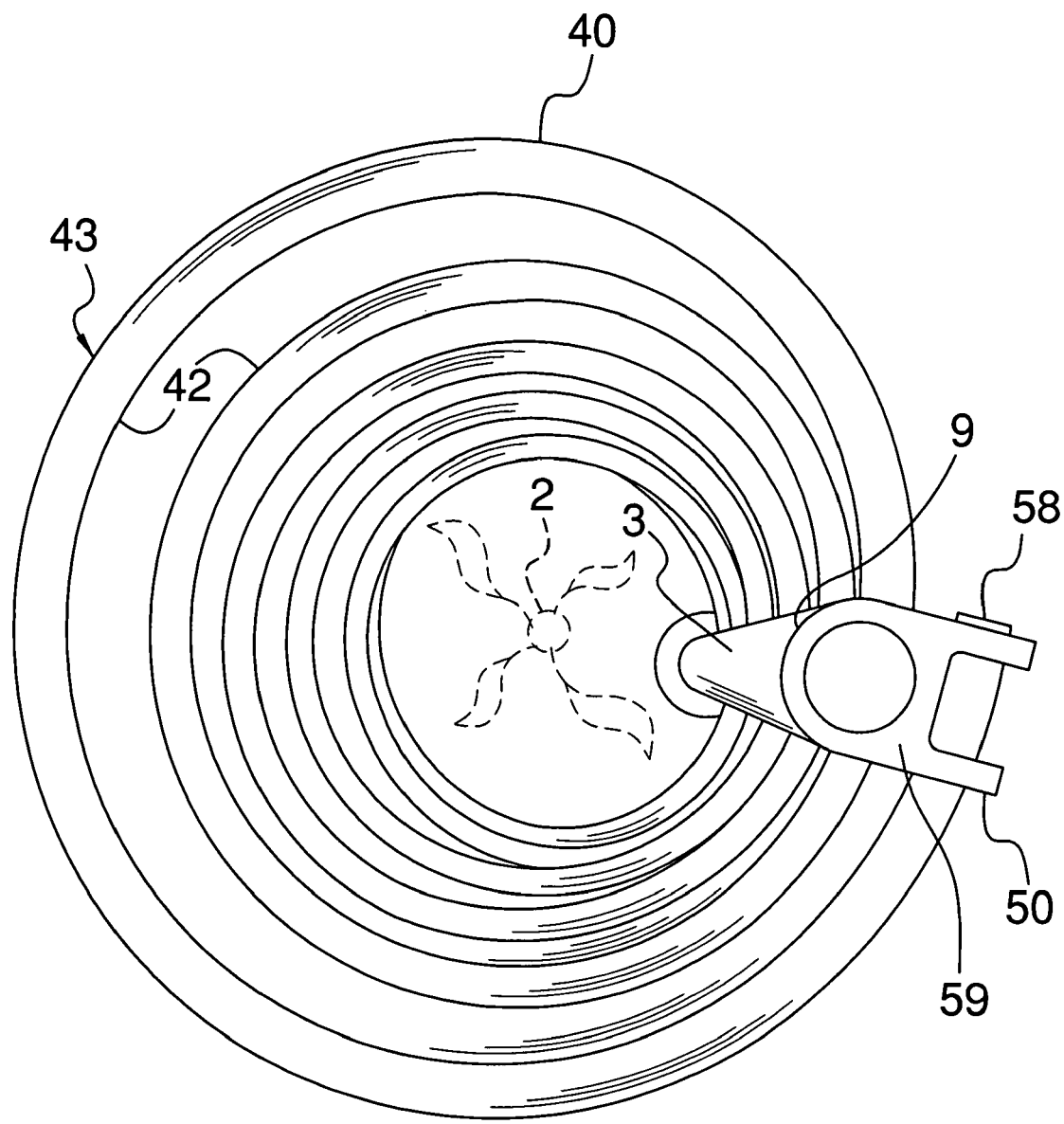
FIG. 3 is a top view of the plant the support shown in FIG. 1.
Figure 4:
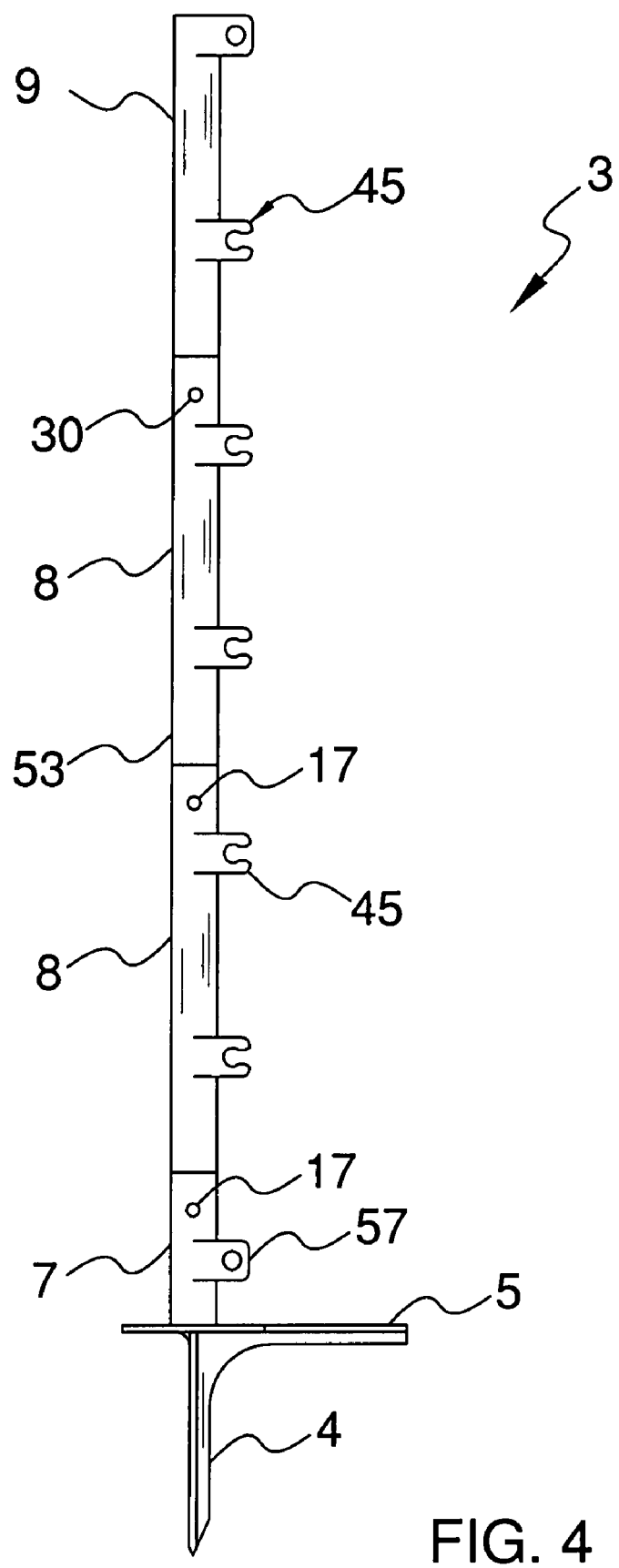
FIG. 4 is a side view of the invention omitting the plant supporting spiral strand.
Figure 5:
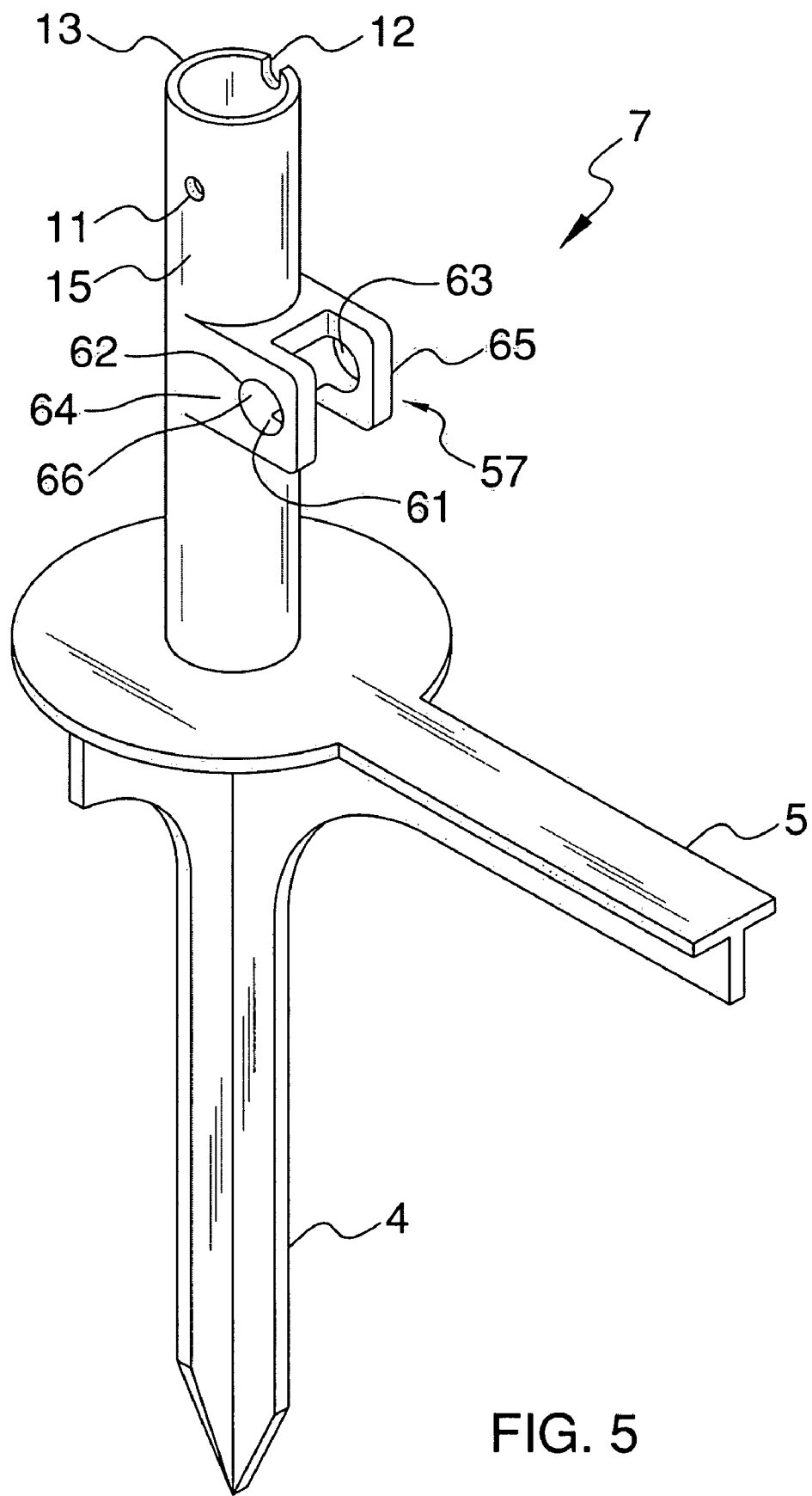
FIG. 5 an enlarged perspective view of a bottom pole section.
Figure 6:
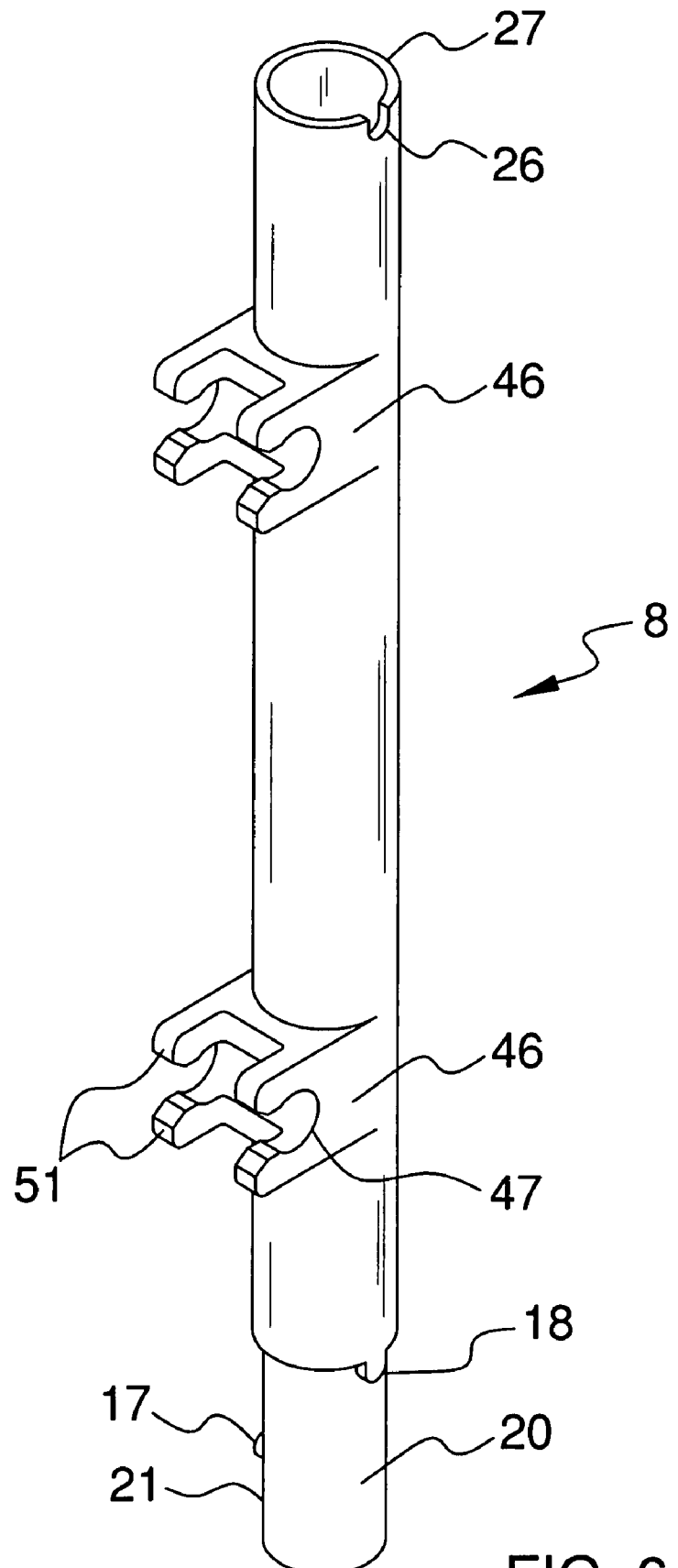
FIG. 6 is an enlarged perspective view of an intermediate pole section.
Figure 7:
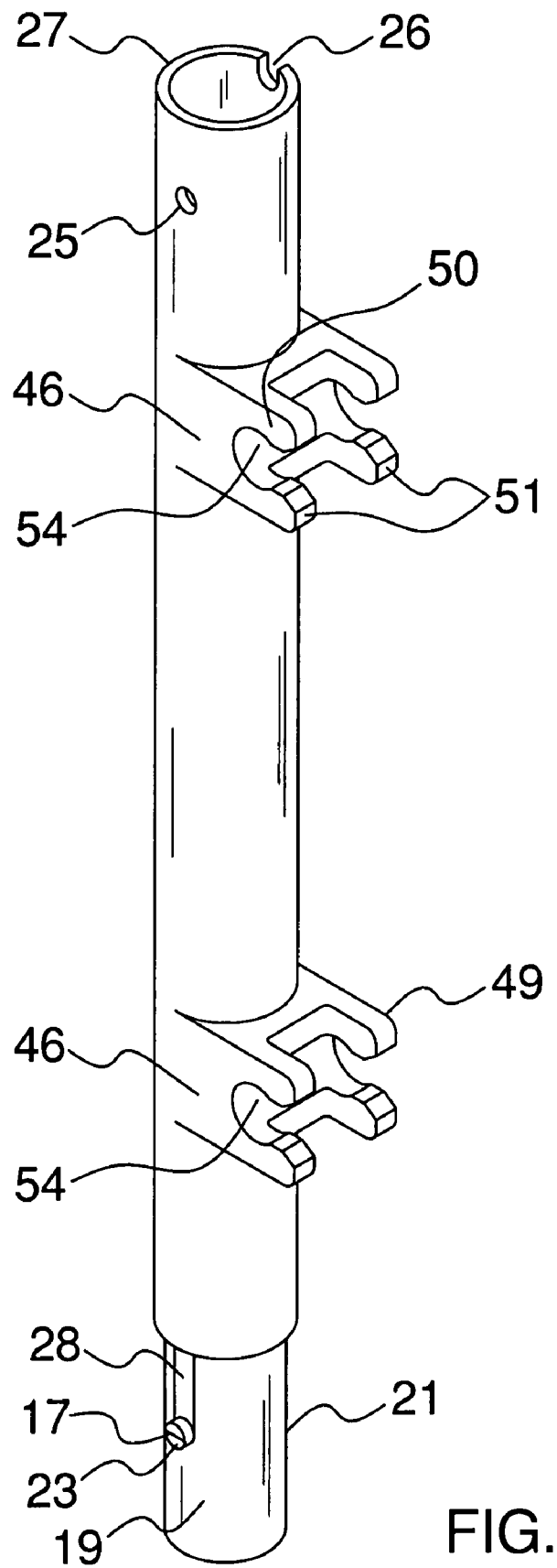
FIG. 7 is a different enlarged perspective view of an intermediate pole section.
Figure 8:
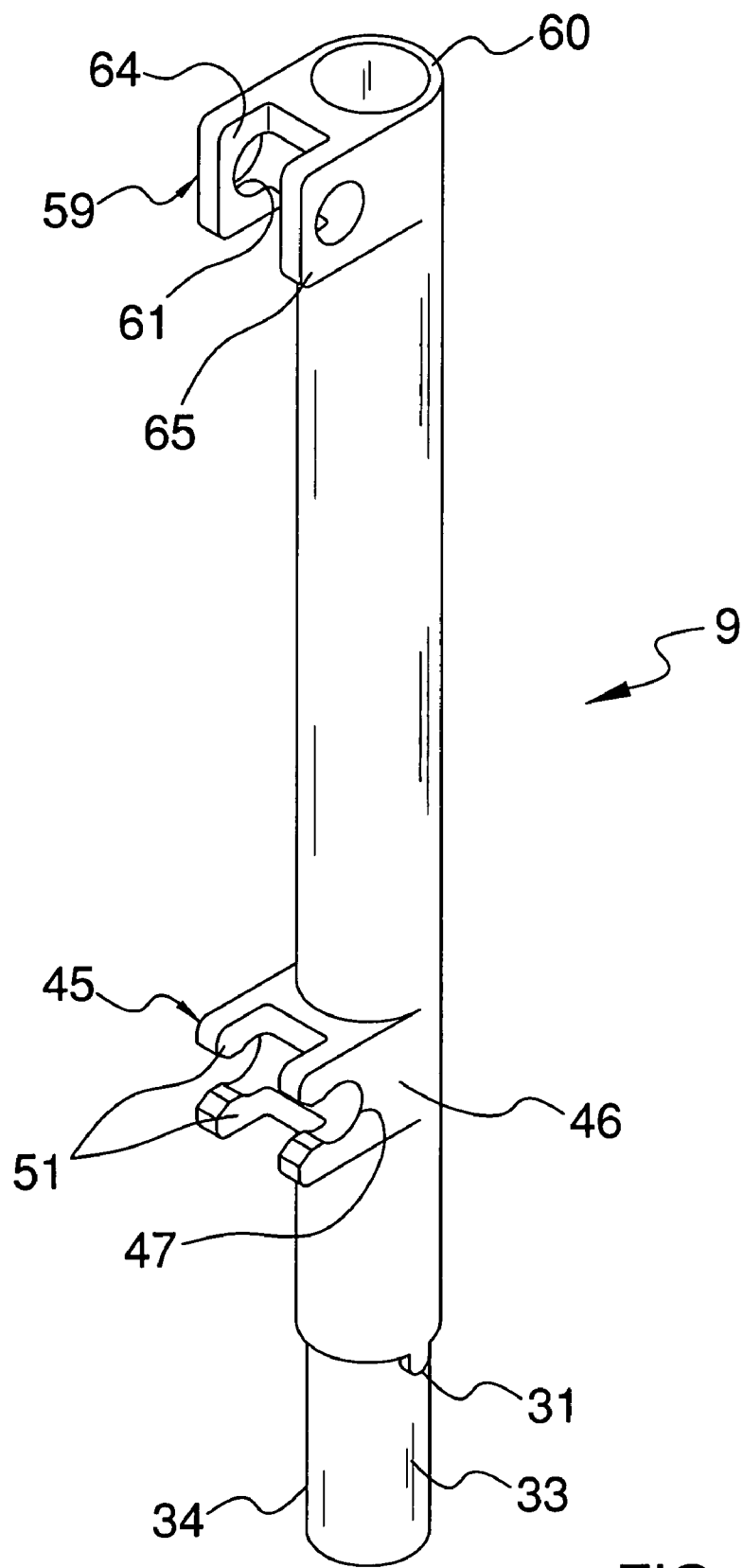
FIG. 8 is an enlarged perspective view of a top pole section.

A hollow, circular tube made from flexible, resilient, compressible plastic resin, such as PE 3408 polyethylene having a wall thickness of 2.5 mm, and a predetermined outer diameter 41 of 19 mm., may be used as the plant supporting strand 40. When the tubular strand 40 is wound around pole 3 and tightened into the loops or spirals 42 of a helix 43, as illustrated herein, a "sweet spot" results in tension within the helix that creates a sufficient amount of rigidity to support the mature fruit of tomato plants. For example, loops 42 with a diameter of about twelve inches spaced vertically about ten inches apart can support, with only one inch of deformation, at least two pounds of downward pressure or weight at their weakest point, which is the point farthest from the support pole 3. The tighter the spiral 43, the more rigid it becomes and the more weight the loops 42 in the strand 40 can support. The loops 42 should be generally aligned, as shown in FIG. 3.

A plurality of connectors 45 may be used to attach the strand 40 to the pole 3. Each of the connectors 45 is an integral part of a section 7, 8 or 9 of the pole 3, and may define a quick-release fastener or clamp 46 having a circular opening 47 therethrough with a diameter 48 that is approximately the same as the outer diameter 41 of strand 40. The circular opening 47 defines two pairs 49 and 50 of identical, opposed, circular, open-ended clamp jaws 51, which are separated by a distance 52 that is less than the outer diameter 41 of the strand 40. The circular opening 47 also defines in each connector a semicircular groove 54 that merges with and into the pairs 49 and 50 of clamp jaws 51. The pairs of jaws 49 and 50 are parallel to each other and project perpendicularly from the surface at the rear 53 of the assembled pole sections. The groove 54 retains the strand 40 in a horizontal orientation, which increases the tension within the helix 43 and gives additional rigidity to the spirals 41. The result of this configuration and the configuration of the interlocking means 10 described above is that the connectors 45 and their clamping jaws 51 are located and arranged in a vertically alignment along the rear side 53 of the pole 3.

Since the jaws 51 of each pair 49 and 50 of clamps are separated by a distance 52 that is smaller than the outer diameter 41 of the compressible hollow strand 40, the strand 40 may be wound around the pole 3, compressed, and quickly pressed between, or easily pulled out of, the pairs of jaws 51 of any of the connectors. This enables the strand 40 to be spirally wound around the pole 3 and attached to the rear side 53 of the pole 3, leaving the loops 42 unobstructed by the plant supporting structure.

The lower end 56 of the strand 40 may be held in a first receiver 57 that is integral with bottom pole section 7 and the upper end 58 of strand 40 may be held in a second receiver 59 that is integral with top pole section 9. The receivers 57 and 59 are identical and are both located on the rear side of their respective pole sections so that the receivers will be aligned with the connectors 45 when the pole 3 is in use. First receiver 57 may be located about midway between the upper edge 13 of bottom pole section 7 and the crosspiece 5, where receiver 57 serves the function of the connector 45 for holding the strand 40 on pole section 7. Second receiver 59 may be located at the upper terminal edge 60 of the top pole section 9.

Each receiver has a circular opening 61. The circular opening 61 defines aligned circular holes 62 and 63 in a pair of parallel arms 64 and 65 that project perpendicularly from the surface at the rear 53 of the pole sections. A semicircular groove 66 merges with and into the circular holes 62 and 63, in the same manner as the groove 54 merges with the clamp jaws 51 The diameter of the circular holes 62 and 63 and the groove 66 is approximately the same as or slightly larger than the outer diameter 41 of the strand 40. The groove 66 retains the ends of the strand 40 in a horizontal position, which increases the tension on the strand as it is bent to form the spirals 42 of the helix 43, and this tension holds the ends 56 and 58 securely in place.

This permits easy insertion of one end of the strand 40 into one of the receivers at the rear of the pole 3, and winding of the strand 40 around the front of the pole and back to the rear 53, and pressing the strand 40 into a connector 45 at the rear of the pole so as to form one of the loops 41, and so on until a helix 43 with the required number of loops 42 has been formed. If after a plant has started growing the gardener desires to increase or decrease the height of the pole 3, or to change the size or the number of loops 42, this can be easily accomplished by snapping the strand 40 out of one or more quick-release clamps 46, and adjusting the size or number of loops 42, or by removing or adding another intermediate pole section 8 and repositioning the strand 40 to form a different number or differently sized loops 42.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. An adjustable length plant support comprising: a compressible, flexible strand having uppermost and lowermost ends, a pole of adjustable length for holding up said strand, and a plurality of connectors for attaching said strand to said pole;

said flexible strand being sufficiently rigid to support said plant and having a generally circular cross section with a outer diameter of predetermined length;

said pole comprising a plurality of tubular, separable sections, each of said sections having a coupling adjacent one of its ends joining such section to another of said sections, at least one of said connectors being secured to each of said pole sections;

said connectors defining quick-release clamps having a circular opening of predetermined diameter therethrough, said predetermined diameter of said circular opening being approximately the same as said predetermined outer diameter of said flexible strand, said circular opening defining a pair of opposed, circular, open-ended clamp jaws, said clamp jaws being separated by a distance that is less than said predetermined length of said outer diameter of said strand, so that insertion of said flexible strand between a pair of clamp jaws compresses said flexible strand into a clamp and holds said flexible strand;

said couplings that join said separable pole sections being located and arranged so that said connectors are separated and secured in vertical alignment along one side of said pole so that holding said flexible strand in successive vertically separated clamps attaches said flexible strand in a series of vertically separated and generally aligned loops spiraling around said pole; and the length of said plant support pole being determined by the number of coupled pole sections, said pole comprising a bottom section, a top section and at least one intermediate section, each of said sections comprising a resilient hollow plastic tube, and said couplings comprising interlocking means on each of said sections for joining and disconnecting said intermediate section to and from said bottom section and joining and disconnecting said top section to and from said intermediate section, said bottom pole section having a first receiver integral therewith, the lowermost end of said strand being inserted into said first receiver, a second receiver integral with said top pole section and located above the clamp on said top pole section, the uppermost end of said strand being inserted into said second receiver, said first and second receivers each comprising a pair of identical parallel arms projecting perpendicularly from its pole section, each pair of arms having aligned circular holes sized to enable insertion of an end of said strand.

2. A spiral plant support comprising: a hollow, compressible flexible strand having free, upper and lower ends, a resilient, hollow, tubular pole for holding up said strand and a plurality of connectors each of which is an integral portion of said pole for attaching said strand to said pole;

said flexible strand being sufficiently rigid to support said plant and having a generally circular cross section with a outer diameter of predetermined length;

each of said connectors defining a quick-release clamp having a circular opening of predetermined diameter therethrough, said predetermined diameter of said circular opening being approximately the same as said predetermined outer diameter of said flexible strand, said circular opening defining a pair of opposed, circular, open-ended clamp jaws, said clamp jaws being separated by a distance that is less than said predetermined length of said outer diameter of said strand so that insertion of said flexible strand between said clamp jaws compresses said flexible strand into clamps that hold said flexible strand in said integral connectors;

said integral connectors being separated and aligned vertically along one side of said pole so that clamping of said flexible strand in successive vertically aligned connectors attaches said flexible strand to said pole in a series of vertically separated, unobstructed and generally aligned loops that spiral around and surround said pole; and each of said connectors comprising a second pair of opposed, circular, open-ended clamp jaws defined by said circular opening in said connector, said second pair of clamp jaws being parallel to and identical to the first mentioned pair of clamp jaws, said circular opening defining a semicircular groove in said connector between said pairs of clamp jaws, said groove merging with said pairs of clamp jaws, and a first receiver adjacent to the bottom of said pole into which the lower free end of said strand is inserted, and a second receiver adjacent the top of said pole into which the upper free end of said strand is inserted.

3. The spiral plant support defined in claim 2, further comprising: said pole comprising a bottom section, a top section and at least one intermediate section, and couplings comprising interlocking means on each of said sections for joining and disconnecting said intermediate section to said bottom section and joining and disconnecting said top section to said intermediate section.

4. An adjustable length plant support comprising: a compressible, flexible strand, a pole of adjustable length for holding up said strand, and a plurality of connectors for attaching said strand to said pole;

said flexible strand being sufficiently rigid to support said plant and having a generally circular cross section with a outer diameter of predetermined length;

said pole comprising a plurality of separable sections having upper and lower terminal edges, each of said sections comprising a resilient, hollow, plastic tube having a coupling adjacent one of its ends joining such section to another of said sections, at least one of said connectors being secured to each of said pole sections;

each of said connectors defining a quick-release clamp having a circular opening of predetermined diameter therethrough, said predetermined diameter of said circular opening being approximately the same as said predetermined outer diameter of said flexible strand, said circular opening defining a pair of opposed, circular, open-ended clamp jaws, said clamp jaws being separated by a distance that is less than said predetermined length of said outer diameter of said strand, so that insertion of said flexible strand between a pair of clamp jaws compresses said flexible strand into a clamp and holds said flexible strand;

said couplings that join said separable pole sections being located and arranged so that said connectors are separated and secured in vertical alignment along one side of said pole so that holding said flexible strand in successive vertically separated clamps attaches said flexible strand in a series of vertically separated and generally aligned loops spiraling around said pole;

the length of said plant support pole being determined by the number of coupled pole sections;

said couplings comprising interlocking means comprising a hole through one of said pole sections, said hole being located adjacent but spaced below the upper terminal edge of said one pole section, there being a downwardly extending slot through said upper terminal edge of said one pole section, said hole and said slot being in diametrically opposite surfaces of said one pole section, said slot terminating above said hole;

said interlocking means of an other pole section joined with said one pole section comprising a pair of buttons protruding from said other pole section on diametrically opposite surfaces thereof, one of said pair of buttons being located adjacent but spaced above the lower terminal edge of said other pole section, the other of said pair of buttons being located above said one button;

said pair of buttons and said hole and said slot being arranged and located so that simultaneous insertion of said one button into said hole and said other button into said slot interlocks said one pole section to said other pole section, and pressing said one button out of said hole enables disconnecting of said pole sections.

5. The adjustable length plant support defined in claim 4, further comprising: said hole comprising a circular hole, said pair of buttons comprising first and second buttons, said pole comprising a bottom section, a top section and at least one intermediate section, said interlocking means joining and disconnecting said intermediate section to and from said bottom section and joining and disconnecting said top section to and from said intermediate section, the interlocking means of said bottom section comprising a said circular hole therethrough, said circular hole being located adjacent but spaced below the upper terminal edge of said bottom section, said slot extending downwardly through said upper terminal edge of said bottom section, said circular hole and said slot being in diametrically opposite surfaces of said bottom section, said slot terminating above said circular hole, and means at the lowermost end of said bottom section for anchoring said pole in the ground;

the interlocking means of said intermediate section comprising said first and second buttons protruding therefrom on diametrically opposite surfaces, said first button being located adjacent but spaced above the lower terminal edge of said intermediate section, said second button being located above said first button;

said first and second buttons and said circular hole and slot being arranged and located so that simultaneous insertion of said first button into said circular hole and said second button into said slot interlocks said intermediate section to said bottom section, and pressing said first button out of said circular hole enables disconnecting of said bottom and intermediate sections.

6. The adjustable length plant support defined in claim 4, further comprising: said hole comprising a circular hole, said pair of buttons comprising first and second buttons, said pole comprising a bottom section, a top section and at least one intermediate section, said interlocking means joining and disconnecting said intermediate section to and from said bottom section and joining and disconnecting said top section to and from said intermediate section, the interlocking means of said intermediate section comprising a said circular hole therethrough, said circular hole being located adjacent but spaced below the upper terminal edge of said intermediate section, there being a downwardly extending said slot extending downwardly through said upper terminal edge of said intermediate section, said circular hole and said slot being in diametrically opposite surfaces of said intermediate section, said slot terminating above said circular hole;

the interlocking means of said top section comprising said first and second buttons protruding therefrom on diametrically opposite surfaces, said first button being located adjacent but spaced above the lower terminal edge of said top section, said second button being located above said first button;

said first and second buttons and circular hole and slot being arranged and located so that simultaneous insertion of said first button into said circular hole and said second button into said slot interlocks said top section to said intermediate section, and pressing said first button out of said circular hole enables disconnecting of said top and intermediate sections.

7. The adjustable length plant support defined in claim 4, further comprising: said pole comprising a bottom section, a top section and at least one intermediate section, said interlocking means joining and disconnecting said intermediate section to and from said bottom section and joining and disconnecting said top section to and from said intermediate section, the interlocking means of said bottom section comprising a first circular hole therethrough, said first circular hole being located adjacent but spaced below the upper terminal edge of said bottom section, said first slot extending downwardly through said upper terminal edge of said bottom section, said first circular hole and said first slot being in diametrically opposite surfaces of said bottom section, said first slot terminating above said first circular hole, and means at the lowermost end of said bottom section for anchoring said pole in the ground;

the interlocking means of said intermediate section comprising first and second buttons protruding therefrom on diametrically opposite surfaces, said first button being located adjacent but spaced above the lower terminal edge of said intermediate section, said second button being located above said first button, said intermediate section having a second circular hole therethrough, said second hole being located adjacent but spaced below the upper terminal edge of said intermediate section, a second slot extending downwardly through said upper terminal edge of said intermediate section, said second circular hole and said second slot being in diametrically opposite surfaces of said intermediate section, said second slot terminating above said second hole;

the interlocking means of said top section comprising third and fourth buttons protruding therefrom on diametrically opposite surfaces, said third button being located adjacent but spaced above the lower terminal edge of said top section, said fourth button being located above said third button;

said first and third buttons being identical and correspondingly located, said second and fourth buttons being identical and correspondingly located, said first and second holes being identical and correspondingly located, and said first and second slots being identical and correspondingly located;

said buttons, holes and slots being arranged and located so that simultaneous insertion of said first button into said first hole and said second button into said second slot interlocks said intermediate section to said bottom section, and simultaneous insertion of said third button into said second hole and said fourth button into said second slot interlocks said top section to said intermediate section, and pressing said first button out of said first hole enables disconnecting of said bottom and intermediate sections, and pressing said third button out of said second hole enables disconnecting of said top and intermediate sections.

8. The adjustable length plant support defined in claim 7, further comprising: each of said first and third buttons being on a flexible tab defined by a slit cut through the pole section from which each button protrudes, and an outer edge of said first and third buttons being slanted so as to ease entry of said first and third button into and out of said first and second holes.

9. A spiral plant support comprising: a hollow, compressible flexible strand having free, upper and lower ends, a resilient, hollow, tubular pole for holding up said strand and a plurality of connectors each of which is an integral portion of said pole for attaching said strand to said pole:

said flexible strand being sufficiently rigid to support said plant and having a generally circular cross section with a outer diameter of predetermined length:

each of said connectors defining a quick-release clamp having a circular opening of predetermined diameter therethrough, said predetermined diameter of said circular opening being approximately the same as said predetermined outer diameter of said flexible strand, said circular opening defining a pair of opposed, circular, open-ended clamp jaws, said clamp jaws being separated by a distance that is less than said predetermined length of said outer diameter of said strand so that insertion of said flexible strand between said clamp jaws compresses said flexible strand into clamps that hold said flexible strand in said integral connectors; and said integral connectors being separated and aligned vertically along one side of said pole so that clamping of said flexible strand in successive vertically aligned connectors attaches said flexible strand to said pole in a series of vertically separated, unobstructed and generally aligned loops that spiral around and surround said pole;

said pole comprising a plurality of separable pole sections having upper and lower terminal edges, each having a releasable coupling adjacent one of its ends joining such section to another of said sections, at least one of said integral connectors being secured to each of said pole sections;

the couplings comprising interlocking means on each of said pole sections for joining and disconnecting said pole sections to and from each other, said interlocking means comprising a hole through one of said pole sections, said hole being located adjacent but spaced below the upper terminal edge of said one pole section, there being a downwardly extending slot through said upper terminal edge of said one pole section, said hole and said slot being in diametrically opposite surfaces of said one pole section, said slot terminating above said hole;

said interlocking means of an other pole section joined with said one pole section comprising a pair of buttons protruding from said other pole section on diametrically opposite surfaces thereof, one of said pair of buttons being located adjacent but spaced above the lower terminal edge of said other pole section, the other of said pair of buttons being located above said one button;

said pair of buttons and said hole and said slot being arranged and located so that simultaneous insertion of said one button into said hole and said other button into said slot interlocks said one pole section to said other pole section, and pressing said one button out of said hole enables disconnecting of said pole sections.

10. An adjustable length plant support comprising: a flexible strand, a pole of adjustable length for holding up said strand, and a plurality of connectors for attaching said strand to said pole;

said flexible strand being sufficiently rigid to support said plant;

said pole comprising a plurality of separable sections having upper and lower terminal edges, each of said sections comprising a resilient, hollow, plastic tube having a releasable coupling adjacent one of its ends joining such section to another of said sections;

each of said connectors comprising a clamp holding said flexible strand, at least one of said connectors being secured to each of said pole sections so that insertion of said flexible strand into the clamp secured to such pole section attaches said flexible strand to such pole section;

said couplings being located and arranged so that said connectors are separated and secured in vertical alignment along one side of said pole so that holding said flexible strand in successive connectors attaches said flexible strand in a series of vertically separated and generally aligned loops spiraling around said pole;

the length of said plant support pole being determined by the number of coupled pole sections;

said releasable couplings on the separable pole sections comprising interlocking means on each of said pole sections for joining and disconnecting said pole sections to and from each other, said interlocking means comprising a hole through one of said pole sections, said hole being located adjacent but spaced below the upper terminal edge of said one pole section, there being a downwardly extending slot through said upper terminal edge of said one pole section, said hole and said slot being in diametrically opposite surfaces of said one pole section, said slot terminating above said hole;

said interlocking means of an other pole section joined with said one pole section comprising a pair of buttons protruding from said other pole section on diametrically opposite surfaces thereof, one of said pair of buttons being located adjacent but spaced above the lower terminal edge of said other pole section, the other of said pair of buttons being located above said one button;

said pair of buttons and said hole and said slot being arranged and located so that simultaneous insertion of said one button into said hole and said other button into said slot interlocks said one pole section to said other pole section, and pressing said one button out of said hole enables disconnecting of said pole sections.

11. The adjustable length plant support defined in claim 10, further comprising: said hole comprising a circular hole, said pair of buttons comprising first and second buttons, said pole comprising a bottom section, a top section and at least one intermediate section, said interlocking means joining and disconnecting said intermediate section to said bottom section and joining and disconnecting said top section to said intermediate section, said interlocking means of said bottom section comprising said circular hole therethrough, said circular hole being located adjacent but spaced below the upper terminal edge of said bottom section, said slot extending downwardly through said upper terminal edge of said bottom section, said circular hole and said slot being in diametrically opposite surfaces of said bottom section, said slot terminating above said circular hole, and means at the lowermost end of said bottom section for anchoring said pole in the ground;

said interlocking means of said intermediate section comprising said first and second buttons protruding therefrom at diametrically opposite surfaces, said first button being located adjacent but spaced above the lower terminal edge of said intermediate section, said second button being located above said first button;

said first and second buttons and said circular hole and slot being arranged and located so that simultaneous insertion of said first button into said circular hole and said second button into said first slot interlocks said intermediate section to said bottom section, and pressing said first button out of said circular hole enables disconnecting of said bottom and intermediate sections.

12. The adjustable length plant support defined in claim 10, further comprising: said hole comprising a circular hole, said buttons comprising first and second buttons, said pole comprising a bottom section, a top section and at least one intermediate section, said interlocking means joining and disconnecting said intermediate section to said bottom section and joining and disconnecting said top section to said intermediate section, said interlocking means of said intermediate section comprising a said circular hole therethrough, said circular hole being located adjacent but spaced below the upper terminal edge of said intermediate section, said second slot extending downwardly through said upper terminal edge of said intermediate section, said circular hole and said second slot being in diametrically opposite surfaces of said intermediate section, said slot terminating above said circular hole;

said interlocking means of said top section comprising said first and second buttons protruding therefrom at diametrically opposite surfaces, said first button being located adjacent but spaced above the lower terminal edge of said top section, said second button being located above said first button;

said first and second buttons and circular hole and slot being arranged and located so that simultaneous insertion of said first button into said circular hole and said second button into said slot interlocks said top section to said intermediate section, and pressing said first button out of said circular hole enables disconnecting of said top and intermediate sections.

13. The adjustable length plant support defined in claim 10 further comprising: said pole comprising a bottom section, a top section and at least one intermediate section, said interlocking means joining an disconnecting said intermediate section to said bottom section and joining and disconnecting said top section to said intermediate section, said interlocking means of said bottom section comprising a first circular hole therethrough, said first circular hole being located adjacent but spaced below the upper terminal edge of said bottom section, a first slot extending downwardly through said upper terminal edge of said bottom section, said first circular hole and said first slot being in diametrically opposite surfaces of said bottom section, said first slot terminating above said first circular hole, and means at the lowermost end of said bottom section for anchoring said pole in the ground;

said interlocking means of said intermediate section comprising first and second buttons protruding therefrom at diametrically opposite surfaces, said first button being located adjacent but spaced above the lower terminal edge of said intermediate section, said second button being located above said first button, said intermediate section having a second circular hole therethrough, said second circular hole being located adjacent but spaced below the upper terminal edge of said intermediate section, a second slot extending downwardly through said upper terminal edge of said intermediate section, said second circular hole and said second slot being in diametrically opposite surfaces of said intermediate section, said second slot terminating above said second circular hole;

said interlocking means of said top section comprising third and fourth buttons protruding therefrom at diametrically opposite surfaces, said third button being located adjacent but spaced above the lower terminal edge of said top section, said fourth button being located above said third button;

said first and third buttons being identical and correspondingly located, said second and fourth buttons being identical and correspondingly located, said first and second holes being identical and correspondingly located, and said first and second slots being identical and correspondingly located;

said buttons, holes and slots being arranged and located so that simultaneous insertion of said first button into said first hole and said second button into said second slot interlocks said intermediate section to said bottom section, and simultaneous insertion of said third button into said second hole and said fourth button into said second slot interlocks said top section to said intermediate section, and pressing said first button out of said first hole enables disconnecting of said bottom and intermediate sections, and pressing said third button out of said second hole enables disconnecting of said top and intermediate sections.

14. The adjustable length plant support defined in claim 13, further comprising:

each of said first and third buttons being on a flexible tab defined by a slit cut through the pole section from which each button protrudes, an outer edge of said first and third buttons being slanted so as to ease entry of said first and third button into and out of said first and second holes, and a first receiver integral with said bottom pole section, the an end of said strand being inserted into said first receiver, a second receiver integral with said top pole section and located above said clamp on said top pole section, and an other end of said strand being inserted into said second receiver.

* * * * *